United States Patent
Tsai et al.

(10) Patent No.: US 9,900,497 B2
(45) Date of Patent: *Feb. 20, 2018

(54) SYSTEM AND METHOD FOR PRESERVING VIDEO CLIPS FROM A HANDHELD DEVICE

(71) Applicants: Albert Tsai, Chicago, IL (US); David Yip, Evanston, IL (US)

(72) Inventors: Albert Tsai, Chicago, IL (US); David Yip, Evanston, IL (US)

(73) Assignee: Fast Model Holdings LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/390,652

(22) Filed: Dec. 26, 2016

(65) Prior Publication Data

US 2017/0237896 A1    Aug. 17, 2017

Related U.S. Application Data

(63) Continuation of application No. 15/148,788, filed on May 6, 2016.
(Continued)

(51) Int. Cl.
    *H04N 5/232*      (2006.01)
    *G06F 3/16*      (2006.01)
    *H04M 1/725*      (2006.01)
    *H04N 5/77*      (2006.01)
    *H04N 9/82*      (2006.01)
(Continued)

(52) U.S. Cl.
CPC ......... *H04N 5/23216* (2013.01); *G06F 3/167* (2013.01); *H04M 1/72519* (2013.01); *H04N 1/32358* (2013.01); *H04N 5/232* (2013.01); *H04N 5/772* (2013.01); *H04N 7/185* (2013.01); *H04N 9/8205* (2013.01); *H04M 2250/22* (2013.01); *H04M 2250/52* (2013.01)

(58) Field of Classification Search
CPC .................................................. H04N 5/23216
See application file for complete search history.

(56) References Cited

U.S. PATENT DOCUMENTS 7,757,049 B2 *   7/2010   Hastings ............. G06F 13/4239
                                                                                                                 710/53
9,317,458 B2 *   4/2016   Bushen ............... G06F 13/1663
(Continued)

*Primary Examiner* — Roberto Velez
*Assistant Examiner* — Cynthia Segura
(74) *Attorney, Agent, or Firm* — Clifford H. Kraft

(57) ABSTRACT

A system and method for recording video that combines video capture, touch-screen and voice-control technologies into an integrated system that produces cleanly edited, short-duration, compliant video files that exactly capture a moment after it has actually occurred The present invention maintains the device in a ready state that is always ready to capture video up to N seconds or minutes in the past (where N depends on available system memory). This enables the user to run the system indefinitely without having to worry about running out of storage. Touch gestures and voice commands actually initiate captures without having to actually monitor the system itself thereby allowing for complete focus on the live action itself. When the user sees something happen, he or she can use an appropriate voice or touch command to cause the system to create a video media file based on time points derived from the user's commands.

11 Claims, 5 Drawing Sheets

Related U.S. Application Data

(60) Provisional application No. 62/158,835, filed on May 8, 2015, provisional application No. 62/387,350, filed on Dec. 26, 2015.

(51) Int. Cl.
*H04N 1/32* (2006.01)
*H04N 7/18* (2006.01)

(56) References Cited

U.S. PATENT DOCUMENTS

| | | | |
|---|---|---|---|
| 2008/0120476 A1* | 5/2008 | Hastings | G06F 13/4239 711/148 |
| 2011/0320692 A1* | 12/2011 | Maeda | G06F 3/0613 711/103 |
| 2013/0036277 A1* | 2/2013 | Szczepkowski | G06F 3/0608 711/159 |
| 2013/0101219 A1* | 4/2013 | Bosworth | G06F 17/3079 382/195 |
| 2013/0104080 A1* | 4/2013 | Bosworth | G06Q 10/10 715/838 |
| 2014/0244921 A1* | 8/2014 | Alfieri | G06F 5/10 711/104 |
| 2015/0156552 A1* | 6/2015 | Wayans | H04N 21/47205 386/230 |
| 2016/0093335 A1* | 3/2016 | Doepke | H04N 1/212 386/226 |
| 2016/0180886 A1* | 6/2016 | Cunningham | G11B 27/036 386/224 |
| 2016/0344924 A1* | 11/2016 | Tsai | H04N 5/23216 |
| 2017/0104928 A1* | 4/2017 | Chase | H04N 5/77 |
| 2017/0117018 A1* | 4/2017 | Cunningham | G11B 27/036 |

\* cited by examiner

SYSTEM AND METHOD FOR PRESERVING VIDEO CLIPS FROM A HANDHELD DEVICE

This is a continuation-in-part of application Ser. No. 15/148,788 filed May 6, 2016 which claimed priority to U.S. Provisional patent application No. 62/158,835 filed May 8, 2015. This application also claims priority from U.S. Provisional patent application No. 62/387,350 filed Dec. 26, 2015. Application Ser. Nos. 15/148,788, 62/158,835 and 62/387,350 are hereby incorporated by reference in their entireties.

FIELD OF THE INVENTION

The present invention relates generally to video and more particularly to a system and method where a user can create a video clip of reasonable size from a handheld device using gestures, voice commands or virtual buttons.

DESCRIPTION OF THE PROBLEM

The proliferation of mobile devices outfitted with onboard video cameras has caused many people to become a part-time videographers trying to capture on video the next viral video that will provide somebody their fifteen minutes of fame.

The difficulty with using current mobile video technology is that it requires a combination of good luck (right place, right time), patience (actively recording for large periods of time hoping something will happen) and skill (actually completing the capture and then editing it down to a manageably-sized video file that can consumed by an audience) to capture the "moments" everybody is interested in. More often than not, the best moments get missed—either because the user cannot initiate a capture in time, or because finding and extracting the relevant content out of a very large recording is too cumbersome and difficult.

SUMMARY OF THE INVENTION

Rather than relying on a planned (i.e. staged) or predictive (i.e. anticipating when something will happening and initiating a recording session) approach to video capture, the present invention relates to a reactive method for recording video that combines video capture, touch-screen and voice-control technologies into an integrated system that produces cleanly edited, short-duration, compliant video files that exactly capture a moment after it has actually occurred The present invention maintains the device in a ready state that is always ready to capture video up to N minutes in the past (where N depends on available system memory). This enables the user to run the system indefinitely without having to worry about running out of storage. Touch gestures and voice commands actually initiate captures without having to actually monitor the system itself thereby allowing for complete focus on the live action itself. When the user sees something happen, he or she can use an appropriate voice or touch command to cause the system to create a video media file based on time points derived from the user's commands:

DESCRIPTION OF THE FIGURES

The following drawings illustrate features of the present invention.

Figure 1:
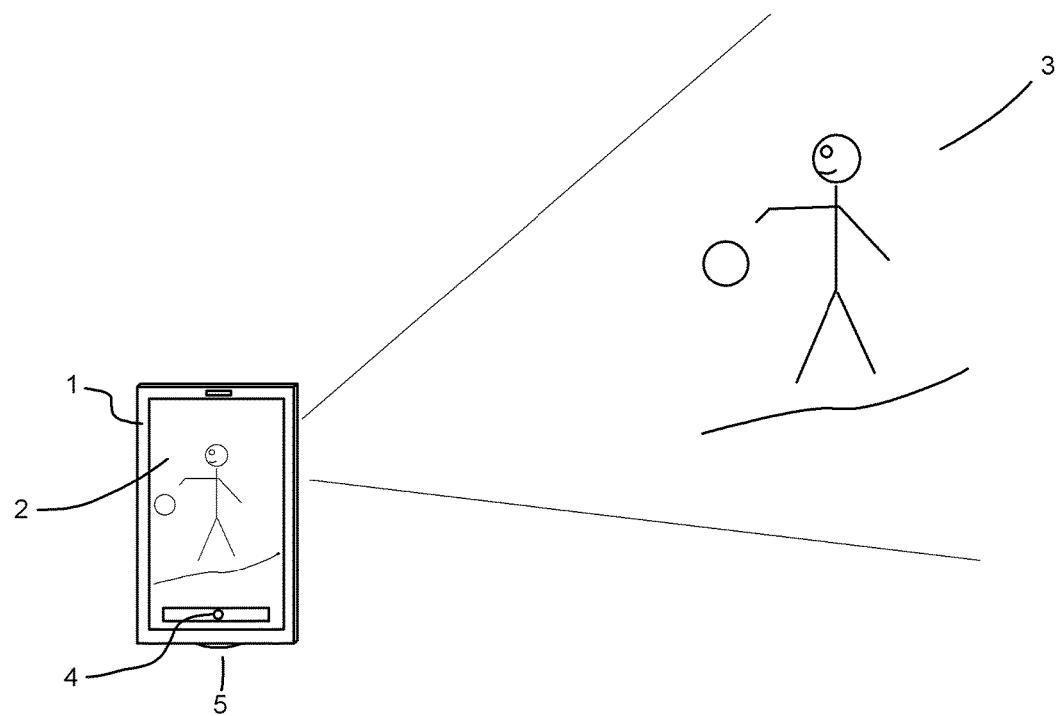
FIG. 1 shows a schematic diagram of an embodiment of the invention.

Several drawings and illustrations have been presented to aid in understanding the present invention. The scope of the present invention is not limited to what is shown in the figures.

DESCRIPTION OF THE PREFERRED EMBODIMENTS

The present invention relates to a system and method for capturing video moments on a smartphone or other handheld device. It is not limited to handheld devices and will work with any electronic device or computer having a camera. The invention works by allowing the video camera to run while buffering the incoming video stream in a system of buffers. A user indicates by touch gesture or voice command when to start a clip. The clip is typically preset to a certain number of seconds or minutes. The invention can then receive metadata concerning the clip and create one of various types of standard video output files.

The present invention, rather than relying on a planned or predictive approach to video capture uses a reactive method for recording video that combines video capture, touch-screen, voice-control technologies into an integrated system that produces cleanly edited, short-duration, compliant video files that exactly captures a moment after it has actually happened.

The present invention places the device in a state that is always ready to capture video up to N seconds or minutes in the past (where N depends on available system memory and can be set by the user). This enables the user to run the system indefinitely without having to worry about running out of storage.

The user relies on touch gestures and voice commands to actually initiate captures without having to actually monitor the system itself, thereby allowing for complete focus on the live action itself. When the user sees something happen, he or she can use the appropriate voice or touch command to cause the system create a video media file based on time points derived from the user's commands.

For example:

Tap Gesture: create a video file going back N seconds (user configurable).

Press and Hold Gesture: create a video file going back N seconds and ending when the user releases the hold gesture.

Voice Command: attach a meta-data tag to video clip for automated classification or create a video file going back N seconds.

The resulting video is automatically trimmed and tagged with metadata (time, location and user-defined tags) and immediately available for consumption (e.g. playback, social sharing).

Operation

The present invention uses a rolling buffer set including a main buffer and a pre-roll buffer to provide unlimited operation against a finite amount of memory. On startup, both the main and pre-roll buffers are allocated in storage, typically disk storage or its equivalent, and left in a write-ready state. The system interacts with the video camera to store the video stream into the main buffer first. As the main buffer approaches capacity, the system switches to the pre-roll buffer without dropping video frames. The pre-roll buffer is designed to hold only a few seconds of video, just enough time for the main buffer to be closed and re-opened for writing (i.e. purged). If there are any pieces of the main buffer that need to be preserved based on a requested clipping action, those pieces are excised and preserved before the purge operation. When the main buffer is empty and ready, the system redirects the video stream back to the main buffer again without losing a frame thereby allowing the pre-roll to be flushed and be made ready again.

Because the rolling buffer is not flushed until the next time the main buffer reaches capacity, if a user triggers a capture at the start of the main buffer and it has to reach back into the rolling buffer, it can. The captures are generally small enough that they can be stitched back together very quickly before adding the resulting video clip to the library. It is important that pieces of buffers are kept until it is certain they are not needed as part of a capture before they are flushed and lost forever. This is done with reference counting that which is taking place at all times to ensure that any piece of buffered video that might be needed for a future capture is saved off prior to flushing.

The present invention uses a physically-backed buffer approach because the uncompressed video streams usually require too much memory to cover any significant amount of time, especially on a mobile device where battery life, cost and memory are at a premium.

Both the touch-screen and microphone are listening in parallel for input that will establish the start and end points needed to reconstruct a separate clip from the main buffer and possibly pre-roll buffer.

Turning to FIG. 1, a schematic diagram of an embodiment of the present invention can be seen. A user holds his smartphone or other handheld device 1 and the application (App) allows video to stream. The scene 3 is continually streamed into storage in the device 1. The scene 3 can also be seen on the touch screen 2. When the user realizes that an event has occurred that he or she desires to capture, either the virtual button 4 is touched, or a voice command is given through the microphone 5. A clip of N seconds (or minutes) is then extracted from the stored video and converted to a file for further use. The number N can be preset using a supplied setup menu.

Figure 2:
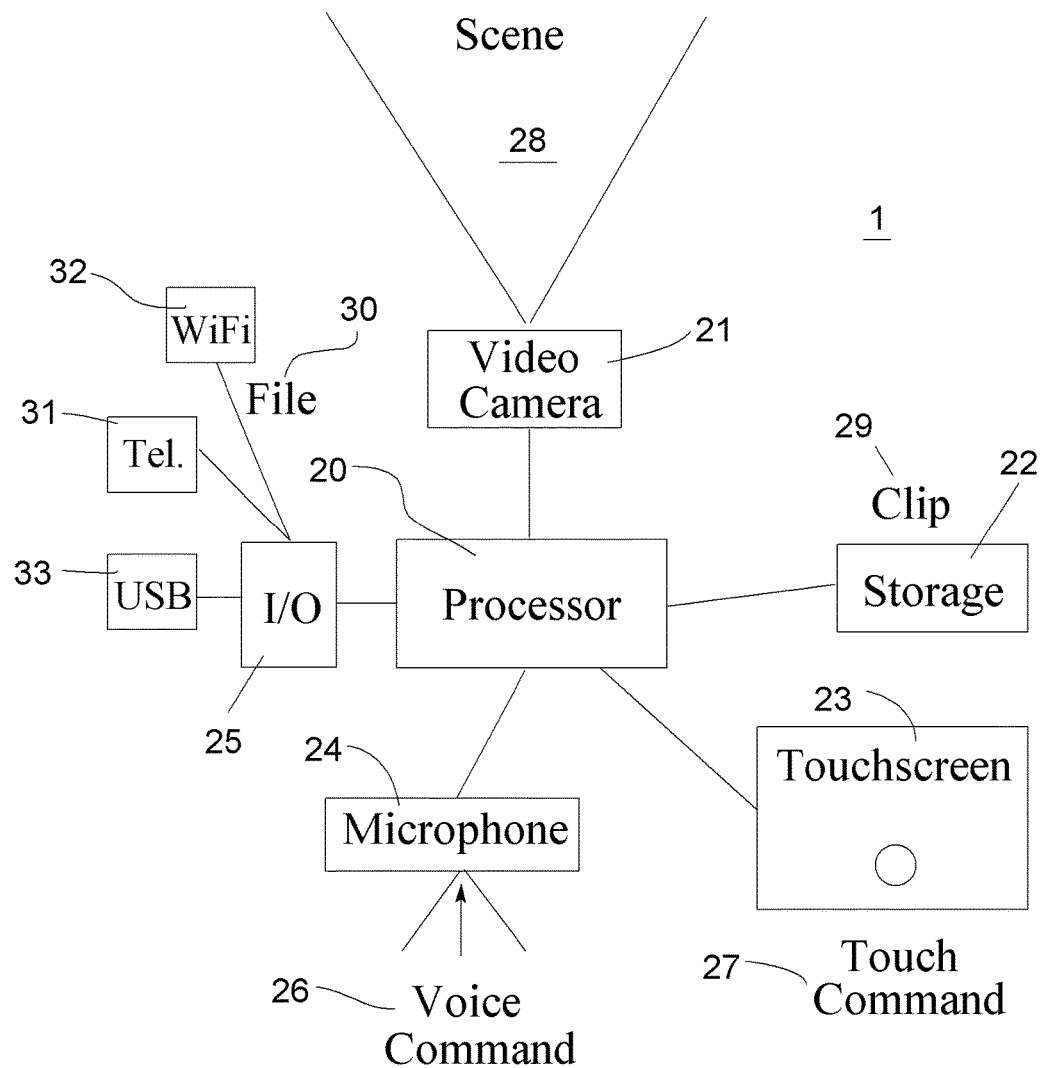
FIG. 2 shows a block diagram of the embodiment of FIG. 1.

FIG. 2 shows a block diagram of the embodiment. A processor 20 which typically resides in the handheld device 1 can be any type of processor capable of executing stored instructions. The processor 20 is electrically connected to storage 22 which can be any type of memory device including internal RAM, disk, flash or plug-in storage, or any other type of storage. Part of the storage 20 contains the executable instructions for downloading and running the App. The processor 20 is also electrically connected to various input/output ports 25 that allow a file 30 to be transferred. These include plug-in Universal Serial Bus ports 33 and other ports, WiFi access 31 and 3G-5G or greater cellular telephone access 32. The processor 20 is also electrically connected to a microphone 26 and a touch screen 23. A video camera 28 supplies electrical signals representing streamed video to the processor 20. The processor 20 executes stored instructions that read the touch screen 23 for touch commands 27 and interpret voice commands 26 from the microphone 24.

The user, upon seeing that a capture is desired, either touches a virtual button on the touch screen 23 executing a touch command 27, or issues a voice command 26 through the microphone 24. This causes the App's executing instructions to save a portion of the video that is N seconds (or minutes) previous to the command. The App. creates one of many different types of video files known in the art including wave files, flash video files, MPEG files and other standard files.

FIGS. 3A-3D show an embodiment of a buffering and counting arrangement that can be used with the present invention. A main buffer 30 typically receives incoming streaming video from the camera 21. A pre-roll buffer 31 remains empty until the main buffer has reached capacity. Video input than switches to the rolling buffer while the main buffer is purged.

Figure 3A:
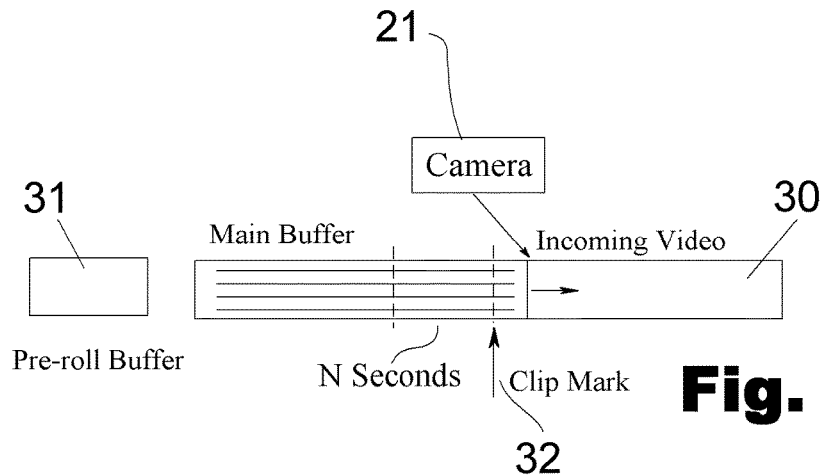
FIGS. 3A-3D show buffer data structures used to perform captures.

FIG. 3A shows the situation where a user has placed a capture or clip mark 32 at a certain point in time in the main buffer. In this case, the main buffer contains the entire N seconds of the clip. The video in the clip region is removed from the main buffer and separately processed into an output file.

Figure 3B:
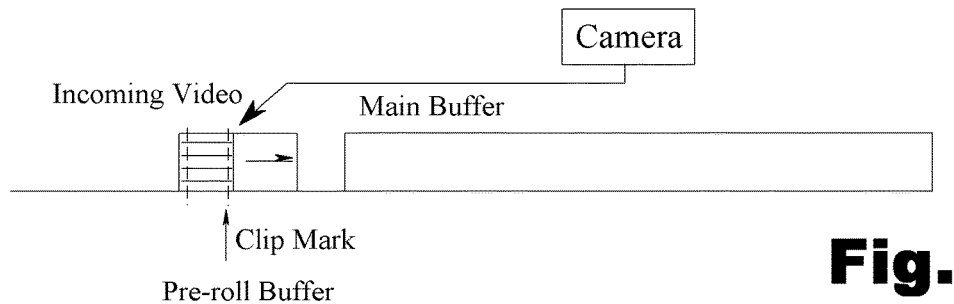

FIG. 3B shows the case where the main buffer is purging, and the entire clip region resides in the rolling buffer. This case is rare since typically, the rolling buffer is much smaller than the main buffer. In this case, the clip is removed from the rolling buffer for processing before the rolling buffer is over-written.

Figure 3C:
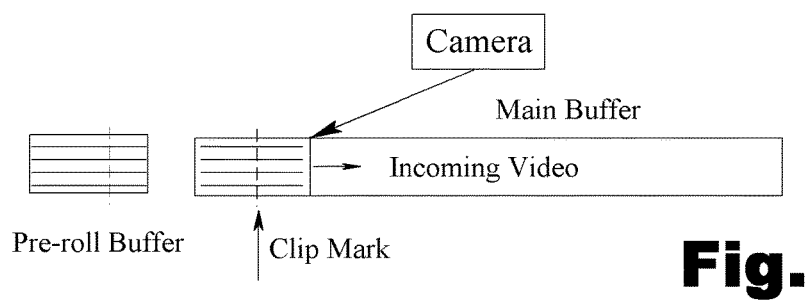

FIG. 3C shows the case where the end of the clip (the clip mark) is in the main buffer; however, the beginning of the clip is in the pre-roll buffer. Here the two parts of the clip must be stitched together to form an entire clip. This is done before the pre-roll buffer over-writes and before the main buffer is again purged.

Figure 3D:
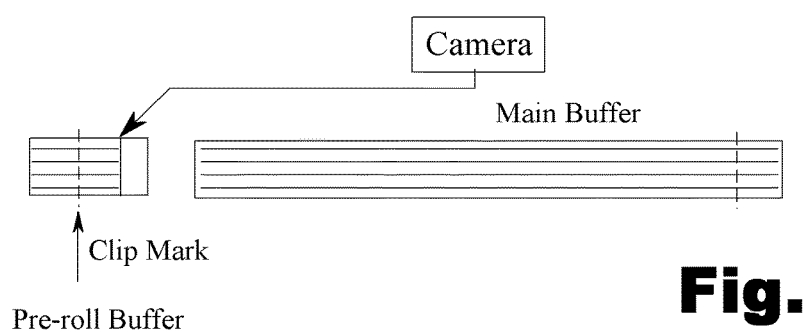

FIG. 3D shows the opposite case where the clip mark representing the end of the clip is in the pre-roll buffer and the beginning of the clip is in the main buffer. Here, again both parts of the clip must be removed from the buffers and stitched together. This must be done quickly before the pre-roll buffer over-writes. Also, there must be enough time to purge the main buffer. The main buffer is typically purged by closing it and re-opening it using operating system commands under an Application Programming Interface (API).

The present invention can be used with any computing device, fixed or handheld. The preferred device is a smartphone with a camera and touch screen. The operating system can be any that supports streaming video such as IOS by Apple, Android which is open-source, Windows CE and Windows Phone 8, or any other operating system.

Fixed Camera Based Version

Problem:

Advances in technology coupled with falling hardware costs has led to the availability of small fixed video cameras that can be used to capture and stream video for a variety of purposes. These "always-on", "always-recording" devices can be used in different domains to provide "hands-free" vantage points to a user that would otherwise be impossible to acquire if the user had to both direct and record an activity himself.

The general problem with video footage acquired via these streamed cameras is that the user almost always ends up with too much video. Over the course of an entire streamed session, there are typically only a few "moments" that are of any actual value. While there are various approaches to extracting these moments from the video session (e.g. manual post-editing, heuristic-based post video analysis), existing solutions are unacceptable because they require enough storage to store the whole stream and they introduce a necessary delay between when a moment happens and when it can be first analyzed, watched or distributed.

Solution:

Rather than store the entire streamed session, the present invention uses a reactive method for recording video that combines video capture, remote-control and voice-control technologies into an integrated system that produce cleanly edited, short-duration, compliant video files that exactly captures a moment after it has actually happened.

The approach puts the fixed camera in a ready state that is always ready to capture video up to N minutes in the past (depending on available system memory). This enables the user to stream and acquire video from the camera indefinitely without having to worry about running out of storage.

The user relies on small controls on the fixed device itself or voice commands to actually initiate capture of a moment. When the user senses something is about to happen (or even after the moment has happened), they can use the appropriate voice or touch command to have the system create a video media file based on time points derived from the user's commands:

Event Command (via direct control or voice control): create a video file going back N seconds (user configurable)

Continuing Event Command (via direct control or voice control): create a video file going back N seconds and ending when the user releases the hold gesture Voice Command: attach meta-data tag to video clip for automated classification The resulting video is automatically trimmed, tagged with meta-data (time, location and user-defined tags) and immediately available for consumption (e.g. playback, social sharing).

Figure 4:
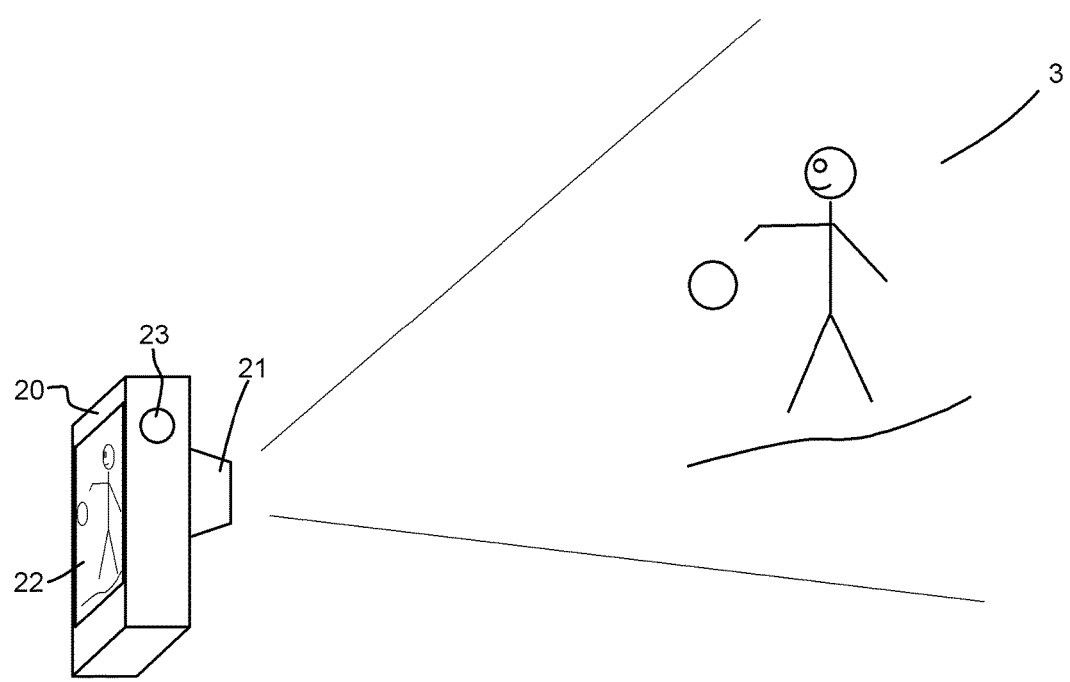
FIG. 4 shows a fixed camera embodiment of the invention.

FIG. 4 shows a sketch of this embodiment. A fixed camera 20 continuously photographs a scene 3. The camera has a lens 21 had usually a view screen 22. The camera can also have a microphone and one or more external controls 23. The camera can receive either voice commands from the microphone, or commands via one of the controls 23 to save a video clip. Meta-data can be entered by voice from the microphone.

Approach:

The present system uses a rolling buffer approach (comprised of a main and a pre-roll buffer) to provide unlimited operation against a finite amount of memory. On startup, both the main and pre-roll buffer are allocated on disk and left in a write-ready state. The system interacts with the video camera to lay the video stream against the main buffer first. As the main buffer approaches capacity, the system switches to the pre-roll buffer without dropping video frames. The pre-roll buffer is designed to hold only a few seconds, just enough time for the main buffer to be closed and re-opened for writing. If there are any pieces of the main buffer that need to be preserved based on a requested clipping action, those pieces are excised and preserved. When the main buffer is ready, the system redirects the video stream back to the main buffer (thereby allowing the pre-roll to be flushed and be made ready again).

The system takes a physically-backed buffer approach because the video streams require too much memory to store uncompressed in order to cover any significant amount of time, especially on a small fixed camera where power consumption and cost of memory are concerns.

There is reference counting occurring at all times to ensure that any piece of buffered video that might be needed for a "future" clip is saved off prior to flushing.

In parallel, on-board processors are "listening" or "watching" for command input that will be used to establish the start and end points needed to reconstruct a separate clip from the main (and possibly pre-roll buffer)

Wearable Based Version

Problem:

Wearable video cameras that provide a user with the ability to easily acquire first-person point of view video can be extremely useful. Video acquired from wearables today are great for documenting and archiving memories. These types of videos are also tremendously useful from a teaching and training perspective.

In general, these wearable cameras work by either recording an entire session (e.g. a bike ride) to local storage on the wearable itself or by streaming a raw continuous video feed to a nearby connected device that can store the video feed itself. Unfortunately, the general problem with video footage acquired via these wearable cameras (whether stored locally or on a connected device) is that the user almost always ends up with too much video. Over the course of an entire streamed session, there are typically only a few "moments" that are of any actual value. While there are various approaches to extracting these moments from the video session (e.g. manual post-editing, heuristic-based post video analysis), existing solutions are unacceptable because they require enough storage to store the whole stream and they introduce a necessary delay between when a moment happens and when it can be first analyzed, watched or distributed.

Solution:

Rather than store the entire streamed session, the present invention uses a reactive method for recording video that combines video capture, remote-control, gesture-recognition and voice-control technologies into an integrated system that produce cleanly edited, short-duration, compliant video files that exactly captures a moment after it has actually happened.

The approach puts the camera in a ready state that is always ready to capture video up to N minutes in the past (depending on available system memory). This enables the user to stream and acquire video from the camera indefinitely without having to worry about running out of storage.

The user relies on gestures recognized by the camera and voice commands to actually initiate capture of a moment, or a button on the camera. When the user senses something is about to happen (or even after the moment has happened), they can use the appropriate voice or touch command to have the system create a video media file based on time points derived from the user's commands:

Event Command (via gesture, voice or remote control): create a video file going back N seconds (user configurable)

Continuing Event Command (via gesture, voice or remote control): create a video file going back N seconds and ending when the user releases the hold gesture Voice Command: attach meta-data tag to video clip for automated classification The resulting video is automatically trimmed, tagged with meta-data (time, location and user-defined tags) and immediately available for consumption (e.g. playback, social sharing).

Figure 5:
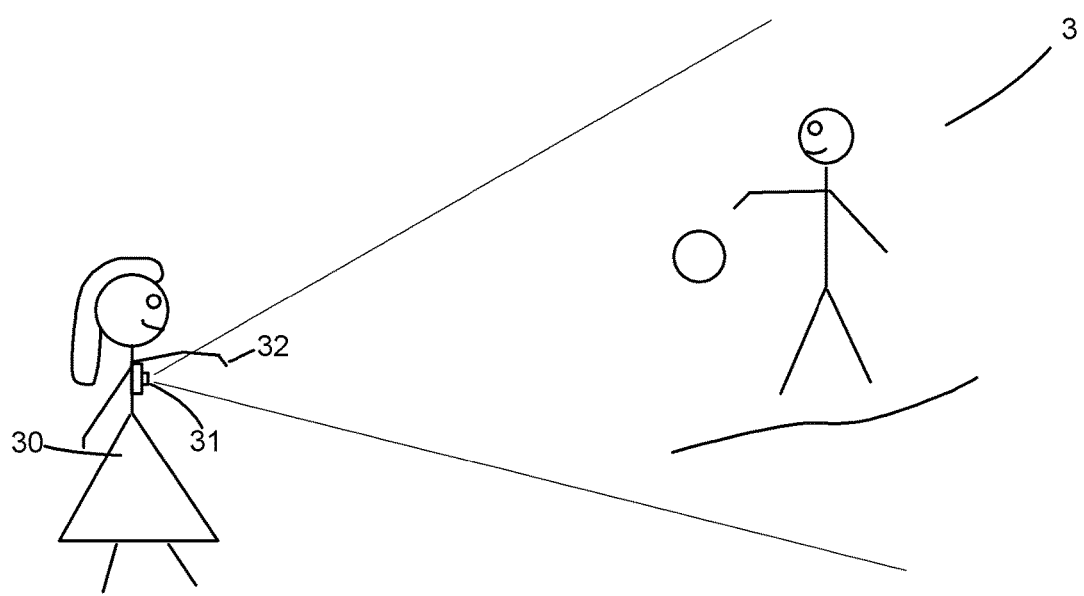
FIG. 5 shows a wearable camera embodiment of the invention.

FIG. 5 shows a sketch of this embodiment. A user 30 wears a camera 31 on clothing or otherwise. The camera 31 continuously records a scene 3. A voice command or a gesture 31 to the camera causes the camera to save the video clip. meta-data can be entered by voice through the microphone.

Approach:

The system uses a rolling buffer approach (comprised of a main and a pre-roll buffer) to provide unlimited operation against a finite amount of memory. On startup, both the main and pre-roll buffer are allocated on disk and left in a write-ready state. The system interacts with the video camera to lay the video stream against the main buffer first. As the main buffer approaches capacity, the system switches to the pre-roll buffer without dropping video frames. The pre-roll buffer is designed to hold only a few seconds, just enough time for the main buffer to be closed and re-opened for writing. If there are any pieces of the main buffer that need to be preserved based on a requested clipping action, those pieces are excised and preserved. When the main buffer is ready, the system redirects the video stream back to the main buffer (thereby allowing the pre-roll to be flushed and be made ready again).

The system takes a physically-backed buffer approach because the video streams require too much memory to store uncompressed in order to cover any significant amount of time, especially on a small wearable camera where power consumption and cost of memory are concerns.

There is reference counting occurring at all times to ensure that any piece of buffered video that might be needed for a "future" clip is saved off prior to flushing.

In parallel, on-board processors are "listening" or "watching" for command input that will be used to establish the start and end points needed to reconstruct a separate clip from the main (and possibly pre-roll buffer).

A more general system is a fixed, handheld, smartphone or wearable video capture system including a processor and memory executing stored executable instructions from the memory. The instructions are configured to allow the processor to interact with a video camera, a button or a touch screen or a microphone on a fixed or wearable device. The stored instructions cause incoming streaming video from the video camera to be stored sequentially in a rolling video buffer, the rolling buffer including K fixed-length buffers in the memory P1, . . . PK starting with buffer P1, where K is a positive integer, and when any buffer Pn of the fixed-length buffers is filled, the processor begins to store incoming streaming video into buffer Pn+1, unless Pn=PK, in which case, the processor begins to store incoming streaming video into buffer P1, and wherein, the processor continually cycles through the plurality of buffers storing L seconds of incoming video, where L is a positive integer.

The executable instructions are configured to allow the processor receive a user command from the button or the touch screen or the microphone at a particular time to save video frames from N seconds of previous video streaming where N is a positive integer less than or equal to L, and to copy these frames to a video output file.

The processor locates the address in the fixed-length buffers where a video frame is stored that begins at time N seconds before the particular time of the user command, and locates a second address in the fixed-length buffers representing a time when the user command was issued. The processor then copies all frames between the first address and the second address to the video output file.

Several descriptions and illustrations have been presented to aid in understanding the present invention. One with skill in the art will realize that numerous changes and variations may be made without departing from the spirit of the invention. Each of these changes and variations is within the scope of the present invention.

We claim:

1. A fixed or wearable video capture system including a processor and memory executing stored executable instructions from the memory, the instructions configured to allow the processor to interact with a video camera, a button or a touch screen or a microphone on a fixed or wearable device, the stored computer instructions causing incoming streaming video from the video camera to be stored sequentially in a rolling video buffer, wherein the rolling video buffer includes a main buffer that is purgable and a shorter pre-roll buffer of fixed length that overwrites when full, wherein the main buffer stores frames until a predetermined capacity is reached whereupon frames are stored in the pre-roll buffer only while the main buffer is purged;

the main buffer including K fixed-length buffers in the memory P1, . . . PK starting with buffer P1, where K is a positive integer, and wherein, when any buffer Pn of the fixed-length buffers is filled, the processor begins to store incoming streaming video into buffer Pn+1, unless Pn=PK, in which case, the processor begins to store incoming frames in the pre-roll buffer while the main buffer is purged; after the main buffer is purged, the processor begins to store incoming streaming frames into buffer P1, and wherein, the processor continually cycles through the plurality of fixed-length buffers and pre-roll buffer storing L seconds of incoming video, where L is a positive integer;

the executable instructions configured to allow the processor receive a user command from the button or the touch screen or the microphone at a particular time to save video frames from N seconds of previous video streaming where N is a positive integer less than or equal to L, and to copy these frames to a video output file;

wherein, if there is are any frames in the main buffer to be preserved based on the user command, those frames are excised from the main buffer and separately stored before the main buffer is purged;

and wherein, if one or more saved frames is in the pre-roll buffer and one or more saved frames is in the main buffer, all saved frames between the first saved frame and the last saved frame are stitched together to form a saved clip, the stitching being performed before the pre-roll buffer over-writes and before the main buffer is purged.

2. The video capture system of claim 1 wherein the user command is actuated by touching the touch screen.

3. The video capture system of claim 1 wherein the user command is actuated by a button on said fixed or wearable device.

4. The video capture system of claim 1 wherein the user command is a spoken command into said microphone.

5. The video capture system of claim 1 wherein the user command is a hold and release touch to the touch screen, wherein the system only begins to save frames from N seconds before when the user holds a portion of the touch screen and stops saving frames when the user releases the portion of the touch screen.

6. The video capture system of claim 1 wherein the video output file is transmitted over a network to a remote computing device.

7. The video capture system of claim 1 wherein streaming video and user commands are transmitted over a network to a remote location, the processor, memory, rolling buffers being located at the remote location.

8. An N second video capture system comprising:
a handheld, fixed or wearable device that includes:
   a video camera;
   a microphone or button;
   a processor and memory executing stored executable instructions from the memory, the instructions configured to allow the processor to interact with a video camera, a button or a touch screen or a microphone on a fixed or wearable device, the stored computer instructions causing incoming streaming video from the video camera to be stored sequentially in a rolling video buffer, wherein the rolling video buffer includes a main buffer that is purgable and a shorter pre-roll buffer of fixed length that overwrites when full, wherein the main buffer stores frames until a predetermined capacity is reached whereupon frames are stored in the pre-roll buffer only while the main buffer is purged;
   the main buffer including K fixed-length buffers in the memory P1, . . . PK starting with buffer P1, where K is a positive integer, and wherein, when any buffer Pn of the fixed-length buffers is filled, the processor begins to store incoming streaming video into buffer Pn+1, unless Pn=PK, in which case, the processor begins to store incoming frames in the pre-roll buffer while the main buffer is purged; after the main buffer is purged, the processor begins to store incoming streaming frames into buffer P1, and wherein, the processor continually cycles through the plurality of fixed-length buffers and pre-roll buffer storing L seconds of incoming video, where L is a positive integer;
   the device also having a processor executing instructions stored in a memory that recognize a user command from the button or the microphone, and upon receiving the user command copy streaming video frames from the camera into a video output file starting N seconds before the user command, where N is a positive integer;
   wherein, if there is are any frames in the main buffer to be preserved based on the user command, those frames are excised from the main buffer and separately stored before the main buffer is purged;
   and wherein, if one or more saved frames is in the pre-roll buffer and one or more saved frames is in the main buffer, all saved frames between the first saved frame and the last saved frame are stitched together to form a saved clip, the stitching being performed before the pre-roll buffer over-writes and before the main buffer is purged.

9. The video capture system of claim 8 wherein the user command is actuated by pressing the button.

10. The video capture system of claim 8 wherein the user command is a spoken command into the microphone.

11. The video capture system of claim 8 wherein the user command is a hold and release touch to the touch screen, wherein the system begins to save frames from N seconds before when the user holds the button and stops saving frames when the user releases the button.

* * * * *